(12) United States Patent
Meidan et al.

(10) Patent No.: US 6,542,881 B1
(45) Date of Patent: Apr. 1, 2003

(54) SYSTEM AND METHOD FOR REVEALING NECESSARY AND SUFFICIENT CONDITIONS FOR DATABASE ANALYSIS

(75) Inventors: Abraham Meidan, Tel-Aviv (IL); Boris Levin, Rishon Letzion (IL); Alexander Cheskis, Maale Adumim (IL); Ilya Vorobyov, St. Petach-Tikva (IL)

(73) Assignee: Wizsoft Inc., New York, NY (US)

( * ) Notice: Subject to any disclaimer, the term of this patent is extended or adjusted under 35 U.S.C. 154(b) by 253 days.

(21) Appl. No.: 09/632,239

(22) Filed: Aug. 3, 2000

(51) Int. Cl.[7] .............................. G06F 17/00; G06N 5/00
(52) U.S. Cl. .............................................. 706/45; 707/6
(58) Field of Search .............................. 706/45, 46, 47; 707/6

(56) References Cited

U.S. PATENT DOCUMENTS

| | | | |
|---|---|---|---|
| 5,841,947 A | 11/1998 | Nordin | 706/13 |
| 5,946,675 A | 8/1999 | Sutton | 706/25 |

OTHER PUBLICATIONS

Jong Soo Park et al; Mining Association Rules with Adjustable Accuracy; 1997; ACM 0-89791-970; 151-160.*

James D. Kiper; Structural Testing of Rule-Based Expert Systems; 1992; ACM Transactions on Software and Methodology; Vo 1, No 2; 168-187.*

* cited by examiner

Primary Examiner—John Follansbee
Assistant Examiner—Joseph P. Hirl
(74) Attorney, Agent, or Firm—Mark M. Friedman

(57) ABSTRACT

The present invention aims to improve data mining results, and improve prediction ability for data mining activities. It encompasses a system and method for revealing the set of necessary and sufficient conditions of the values in one of the data set fields, selected by the user as the dependent variable. Based on revealing the if then rules that relate the dependent variable to the other fields by one of the known association rule systems. These if-then rules are then tested against the dependent variable values, and where they are both positive and above a pre-determined threshold, the results are a set of necessary and sufficient conditions.

4 Claims, 1 Drawing Sheet

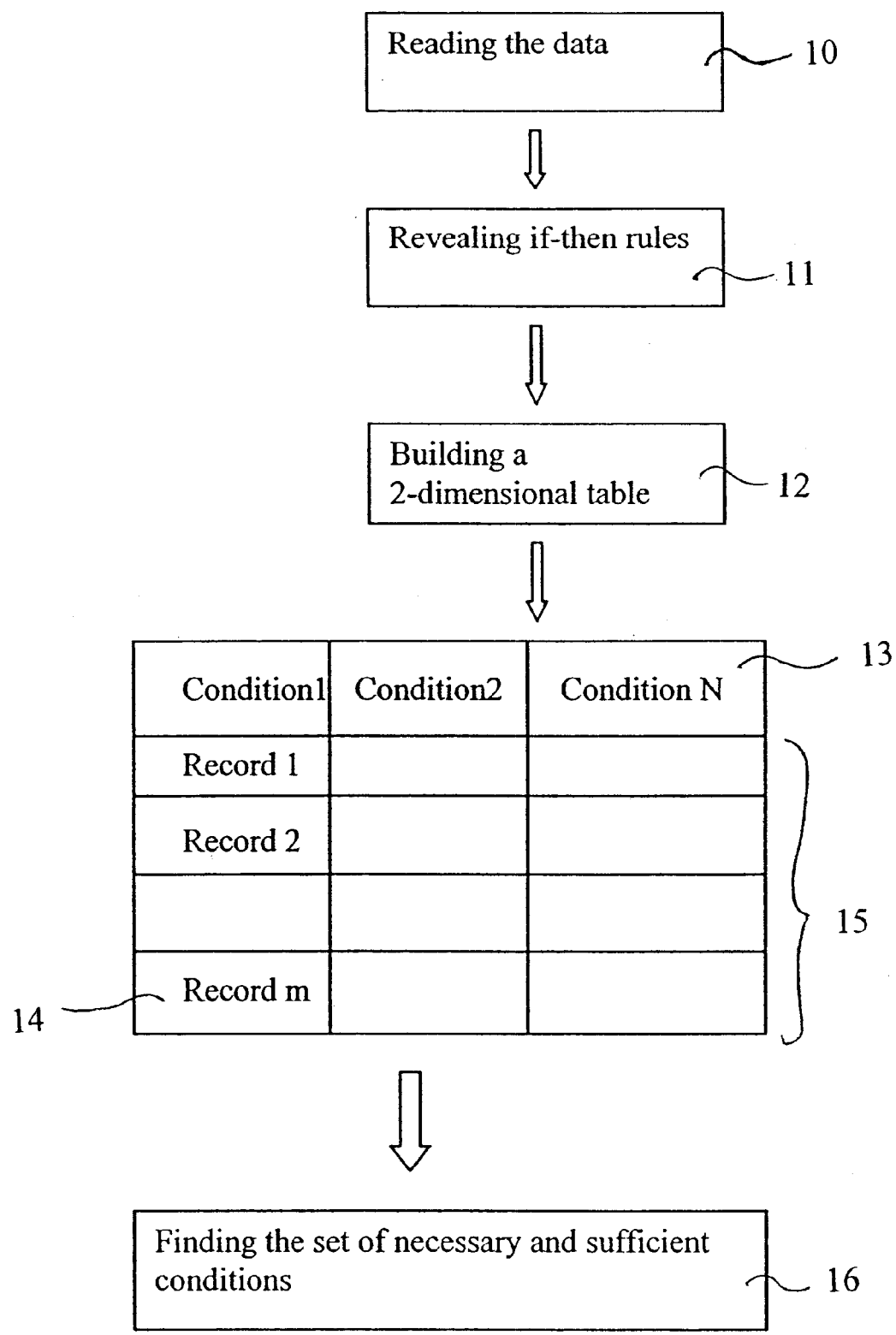
FIGURE

SYSTEM AND METHOD FOR REVEALING NECESSARY AND SUFFICIENT CONDITIONS FOR DATABASE ANALYSIS

FIELD AND BACKGROUND OF THE INVENTION

The present invention relates to a system and method for revealing the set of necessary and sufficient conditions of the values in one of the data set fields, selected by the user as the dependent variable. With the exception of very small data sets, the necessary and sufficient conditions cannot be revealed manually, nor can known software tools reveal them. The present invention fills this gap.

Data mining, also known as knowledge discovery in databases, has become a new area for database research. There is currently a massive volume of data stored in electronic format, and this has resulted in an increase in use of electronic data gathering devices. The powerful computing power and data storage resources available today have encouraged this data storage phenomenon.

Alongside this accumulation of data, there arose a complimentary need to focus on how to utilize this valuable resource. Businesses soon recognized that valuable insights could be gleaned from this data about, financial risk, quality control and customer behavior. Data mining generally includes the analysis of data and the use of software techniques for finding patterns and regularities in sets of data.

The current data mining techniques are limited to the discovery of if-then rules that relate between the values of the dependent variable and the values of the other fields in the database. These if-then rules present sufficient conditions (the if-condition is a sufficient condition for the then-result), but they fail to reveal sufficient and necessary conditions (that are presented by if-and-only-if rules). Revealing the set of the necessary and sufficient conditions is important for a causal analysis of the data (the cause is the necessary and sufficient condition for the effect).

There is no known program for revealing necessary and sufficient conditions. There are programs for revealing if-then rules, however as mentioned, if-then rules present sufficient conditions only, and not necessary and sufficient conditions. There are several patents for revealing if-then rules and there are several patents for machine learning tools. For example, U.S. Pat No. 5,946,675: Apparatus for machine learning (incorporated by reference for all purposes as is fully set forth herein), and U.S. Pat. No. 5,841,947: Computer implemented machine learning method and system (incorporated by reference for all purposes as is fully set forth herein).

There are several products for revealing if-then rules, for example Wizrule and Wizwhy from Wizsoft, Short Synopsis of Wizwhy and Wizsoft both execute highly accurate data mining using association rules methodologies.

There are several methods for revealing patterns in data and issuing predictions for new cases. These methods use various algorithms such as neural nets, decision trees and association rules. The main problems in these methods are:

(1) They do not present the patterns in the data in an easy to understand way. Neural nets do not present the patterns (the analysis output is a black box), while decision trees and association rules present so many rules that reading all of them is impractical.

(2) None of the methods for issuing prediction is 100% accurate, and therefore there is a place for additional methods that can be used as alternative or complementary approaches. The main problem of the known algorithms is called "overfitting": the algorithm reveals accidental patterns that hold in the data under analysis but fail to hold in new cases.

There is thus a widely recognized need for, and it would be highly advantageous to have, a system and method that can reveal the necessary and sufficient conditions. These conditions are useful for data analysis and machine learning tasks, because:.

(1) The set of necessary and sufficient conditions summarizes the main patterns in the data and presents the causes for the dependent variable's values.

(2) The set of necessary and sufficient conditions can be used for issuing predictions for new cases. (These predictions will be more accurate than the predictions issued by other machine learning techniques.)

The present invention solves the two previously mentioned problems:

(1) the list of the necessary and sufficient conditions is easy to understand, and (2) since the necessary and sufficient conditions cannot be accidental, the approach of the present invention does not suffer from the problem of overfitting, and as a result its predictions are more accurate.

The present invention is based on a new algorithm that cannot be derived from the known approaches.

SUMMARY OF THE INVENTION

According to the present invention there is provided a system and method for revealing the set of necessary and sufficient conditions of the values in one of the data set fields, selected by the user as the dependent variable. The process is comprised of the following steps:

(1) Revealing the if then rules that relate the dependent variable to the other fields by one of the known association rule systems.

(2) Building a 2-dimensional table where one dimension contains the rule conditions and the other dimension refers to the records of the data. Each cell signifies whether or not the rule-condition holds, and whether or not the dependent variable's value holds in the record.

(3) Finding in the table sets of rule-conditions satisfying the following requirement: If at least one of the rule-conditions holds the probability that the dependent variable's value holds is P1, and if all the rule-conditions do not hold the probability that the dependent variable's value do not hold is P2, where P1 and P2 are above pre-determined thresholds.

The present invention aims to improve data mining results, and improve prediction ability for data mining activities.

BRIEF DESCRIPTION OF THE DRAWING

The invention is herein described, by way of example only, with reference to the accompanying drawing, wherein the FIG. 1 is an illustration of a classic example of the operations of the present invention.

DESCRIPTION OF THE PREFERRED EMBODIMENT

The present invention is of a system and method for revealing necessary and sufficient conditions for database analysis.

Specifically, the present invention can be used to reveal the set of necessary and sufficient conditions of the values in one of the data set fields, selected by the user as the dependent variable. The revelation of these conditions can greatly enhance current methods of reading data sets, analyzing them and making predictions based on the analysis. The invention can be embedded in any device that carries out machine learning tasks. For example it can be embedded in a voice recognition device as a tool that identifies the speech patterns. Other examples of applications resulting from such an invention are analyzing and predicting customer retention, quality control, financial risk and disease diagnosis. An example of the latter is in the case when the invention is applied to a medical data set where each record contains the symptoms and the diagnosis of another patient, each field refers to another symptom and one field, selected as the dependent variable, contains the diagnosis. The invention will reveal the necessary and sufficient conditions for each of the diagnosed illness. When a new patient is checked, the invention can be used for predicting the illness.

The principles and operations of such a system according to the present invention may be better understood with reference to the drawing, and the accompanying description, wherein:

The method of the present invention is comprised of the following steps:

(1) Reading the data 10 and revealing the "if-then" rules 11 that relate between the values of one field, selected by the user as the dependent variable, and the other fields in the data set under analysis. The "if-then" rules are revealed by one of the known systems for revealing association rules.

For example, suppose that you maintain customer data where each record contains a range of fields relating to one customer, such as: Customer Name, Address, City, State, Amount Purchased, % Growth from last year, Sale Person and Lost to a competitor. One of these fields, say, Lost to a competitor, is selected as the Dependent Variable, while the other fields are the Independent Variables or Conditions. In this example, the aim is analyzing customer retention, i.e., revealing the patterns of those customers likely to leave the company for a competitor (or not likely to leave). Let us assume that the frequency of the customers leaving for a competitor is 30%, and the object is to reveal the patterns of the customers who have already left, and to predict which customers are likely to leave in the future.

On analyzing the data, the present invention (or various other association rules programs) performs the following operations:

i. It first reads the data 10. The user is then given the opportunity to fine-tune the analysis by defining parameters such as the minimum probability of the rules, the minimum number of cases in each rule, and the cost of a miss vs. the cost of a false alarm. The present invention follows these "instructions" when issuing the Rule Report.
  ii. After analyzing the data, within a short time, the present invention lists the rules 11 that relate between the Dependent Variable and the other fields. The rules, (which is a set of rules describing the given data) are formulated as "if-then" sentences. For example:
  If the City is New-York, AND
  the Amount purchased is less than $1,000,
     THEN there is a probability of 0.7 that
     Lost to a competitor is True
This probability is in sync with the given instructions, and is known as the confidence level. For example, suppose there are 500 cases in the data set where the condition holds, and of these 500, 0.7 the loss to competitor is Yes, therefore 500*0.7=350 of 500 where loss to competitor is true.

(2) A boolean analysis is then run for each value of the dependent variable, resulting in the building of a 2-dimensional table 12: one dimension contains the said if-then rule conditions 13 and the other dimension refers to the records of the data set 14, such as the actual customers. Each cell in the resulting table 15 signifies whether or not the rule-condition holds, and whether or not the dependent variable's value holds in the record. Following the previous example, one dimension contains the rules conditions, such as: The City is New York AND the amount purchased is less than $1,000. The other dimension contains the value of the dependant variable, ie. yes for Lost to Competitor, or no for not Lost to Competitor.

(3) Finding in the said table the rule condition having the maximum number of records satisfying the following requirement: If the rule condition holds, the said value of the dependant variable holds as well. If the rule condition does not hold, then the dependant variable value also does not hold. i.e. The rule condition holds if and only if the dependant variable value holds. Following the above mentioned example, the condition might be the following: If the City is New York, and the amount purchased is less than $1,000, then there is a 0.7 probability that Lost to a Competitor is True, and if the condition does not hold (i.e., the City is not New York or Amount purchased is equal or higher than $1,000) then there is, for example, a 0.6 probability that Lost to a Competitor is not True.

(4) Repeating the previous step in regard to records not explained by the previous conditions. For example, if the above conditions explained 60% of the cases, another analysis must be run to explain the remaining customers. This process therefore selects the best rules explaining chosen results for all customers.

(5) Checking at the end of each of the previous steps whether the following criteria was met: if at least one of the rule conditions is true, the probability that the dependent variable's value holds is P1; and if all the rule-conditions do not hold, the probability that the dependent variable's value does not hold is P2, where P1 and P2 are above pre-determined thresholds. If the criterion is met, the found set of conditions is the set of the necessary and sufficient conditions 15. This step checks that the results are in sync with the criterion given by the user. For example, suppose we have an additional condition, ie age is above 30. Then we might have the following set of necessary and sufficient conditions: If the customer lives in NY and purchases more than $1000, or of age above 30, then there is a probability of 80% of being lost to a competitor, and, if the customer does not live in NY or does not purchase more than $1000, and is not of age above 30, then there is a probability of 70% of not being lost to competitor.

(6) In an advanced use of the method, the present invention can reveal the optimal set of necessary and sufficient conditions using known optimization techniques. This is achieved by running an analysis on the conditions presented until now, in order to reveal the set of conditions that explain most of the cases. The optimization criterion is as follows:

Notation n—the number of records satisfying at least one of the conditions of the if-and-only-if rule m—the number of records where (1) at least one of the conditions of the if-and-only-if rule holds, and (2) the value of the dependent variable is 1.

N—the total number of records in the data

M—the total number of records in the data where the value of the dependent variable is 1

Assuming that m<M, the aim is to maximize the following optimization criterion:

$$\text{Optimization criterion} = \frac{m*(N-n)}{n*(M-n)}$$

While the invention has been described with respect to a limited number of embodiments, it will be appreciated that many variations, modifications and other applications of the invention may be made.

What is claimed is:

1. Computer implemented method stored on a recordable media for revealing necessary and sufficient conditions for data analysis, according to the steps of:
   i. revealing all if-then rules that relate between the values of one field, selected by a user as a dependent variable, and the other fields in the data set under analysis;
   ii. for each of said if-then rules discovered, running a Boolean analysis for each value of said dependent variable, said analysis being represented in a two-dimensional table;
   iii. finding in said two-dimensional table a rule condition having a maximum number of records, where said rule condition holds if and only if said dependent variable value holds; repeating said iii. in regard to records not explained by said discovered rules, to determine rules best explaining chosen results; and
   iv. checking whether at least one said rule conditions is true, according to a pre-determined threshold, such that conditions meeting said threshold are necessary and sufficient conditions.

2. The method of claim 1, further comprising the step of:
   running an optimization analysis on said conditions presented in order to reveal an optimal set of necessary and sufficient conditions.

3. The method of claim 1, wherein said necessary and sufficient conditions are used to predict future events.

4. The method of claim 1, wherein said necessary and sufficient conditions are used to determine causes of events.

* * * * *